R. S. HYSOM.
VEHICLE ROAD CONSTRUCTION.
APPLICATION FILED NOV. 7, 1921.
1,409,952.
Patented Mar. 21, 1922.
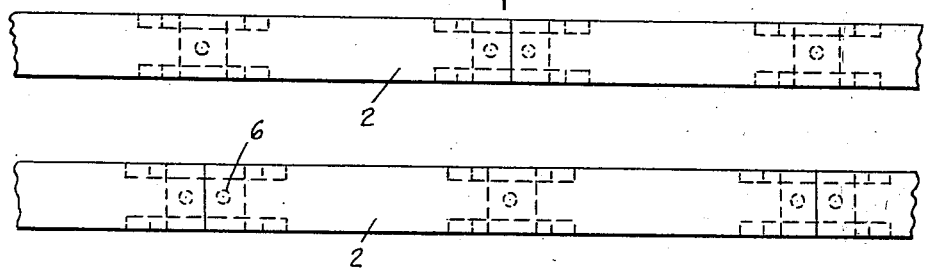
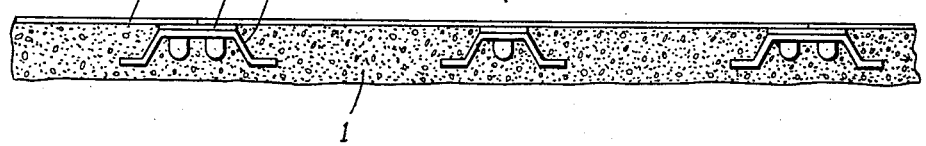
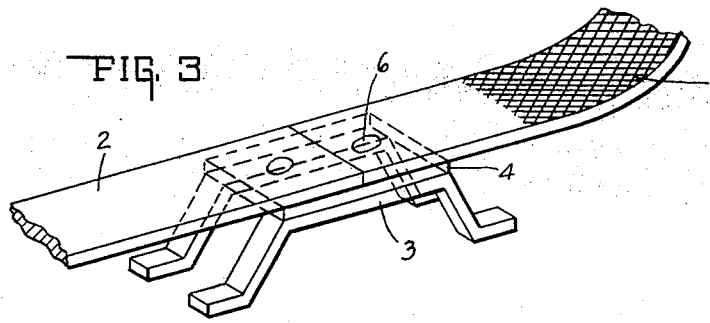
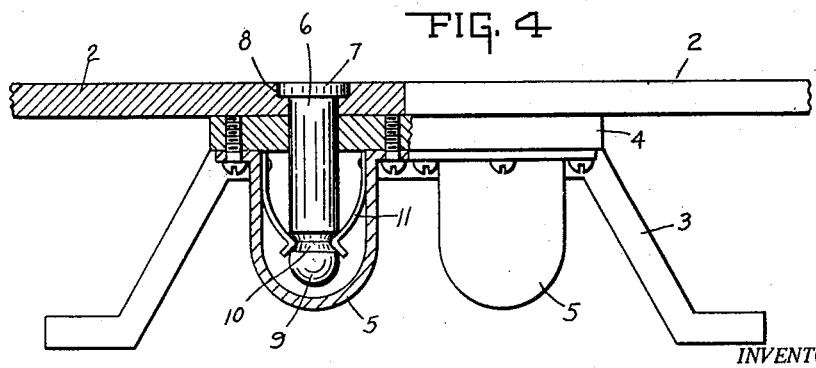
INVENTOR.
Roy S. Hysom.
BY
ATTORNEYS.

UNITED STATES PATENT OFFICE.

ROY S. HYSOM, OF MORRISTOWN, INDIANA.

VEHICLE ROAD CONSTRUCTION.

1,409,952.  Specification of Letters Patent.  Patented Mar. 21, 1922.

Application filed November 7, 1921. Serial No. 513,446.

*To all whom it may concern:*

Be it known that I, ROY S. HYSOM, a citizen of the United States, and a resident of Morristown, county of Shelby, and State of Indiana, have invented a certain new and useful Vehicle Road Construction; and I do hereby declare that the following is a full, clear, and exact description thereof, reference being had to the accompanying drawings, in which like numerals refer to like parts.

This invention relates to a road bed construction, and particularly to that class over which vehicles are adapted to travel, and the prime feature of the invention is the provision of a solid base for the reception of tread plates or rails, whereby the plates will be held level at all times.

A further feature of the invention is the provision of means for removably securing the tread plates or rails in position, whereby said plates may be renewed if necessary without disturbing the base upon which they rest.

A further feature of the invention is the provision of means for properly aligning the tread plates or rails and temporarily supporting the same while the base is being built thereunder.

The full nature of the invention will be more clearly understood from the accompanying drawings and the following description and claims:

In the drawings, Fig. 1 is a top plan view of a portion of a roadway showing two lines of the tread plates or rails in position. Fig. 2 is a vertical longitudinal sectional view through the supporting base showing the rails of one trackway mounted thereon. Fig. 3 is a perspective view of the meeting ends of two of the tread plates attached to a supporting bench and Fig. 4 is an enlarged side elevation, partly in section of one of the benches and a pair of tread plates attached thereto, showing the securing means for the plates.

Referring to the drawings in which similar reference numerals designate corresponding parts throughout the several views, 1 indicates a base, which may be constructed of any suitable material, but preferably of a cement composition, such as concrete, so that when the base is formed and properly set or hardened, it will produce a solid surface and said base preferably extends the full width of the roadway.

In order to provide a smooth and lasting trackway for the wheels of vehicles which may travel over the roadway, rails or tread plates 2, of which two are provided and extend lengthwise of the roadway, said tread plates being formed in lengths and of sufficient width to give a latitude of lateral travel to the vehicle without leaving the rails.

The tread plates 2 are removably secured at the ends and longitudinal centers to the benches 3. Said benches have a platform 4, upon which the tread plates rest, and the benches are preferably embedded in the base structure so as to preserve the same against deterioration. The benches 3 at the meeting ends of the tread plates have depending therefrom a pair of sockets 5, one below the end of each rail, said sockets being designed to receive a securing bolt 6, the upper end of which is provided with a head 7 which fits in a recess 8, in the upper face of the rail, while the lower end of the bolt is rounded. Formed in the periphery of the bolt a short distance above the rounded end 9 is a seat or groove 10 substantially V-shaped in cross section. Cooperating with the seat 10 are spring arms 11, the upper ends of said arms being attached to the walls of the socket, while the lower ends thereof are inclined to fit the seat 10 and yieldingly interlock therewith, and it will be readily seen that the bolt 6 will be held against casual disengagement, thus securely holding the tread plates in position. By applying upward pressure on the bolt it may be disengaged from the arms 11 so that the bolt can be removed from the rail and a new rail introduced in place if necessary, or any repair work performed upon the base structure and tread plates. The bench at the longitudinal center of each rail has only one socket thereon, as but one bolt is used in connection with the rail at this point.

It will be understood, of course, that any suitable means may be employed for temporarily supporting the tread plates or rails while the base portion is being built, and it will likewise be understood that any suitable device may be used for anchoring the ends of the rails to the benches.

When the rails are extended over an inclined surface the faces of the rails are preferably roughened as at 12, Fig. 3, or the rails may be corrugated if desired, or any suitable form of tread surface may be used to prevent the wheels of the vehicles from slipping.

In the standard roadway there are two sets of trackways, so that vehicles traveling in opposite directions will not be required to turn out to pass each other, but, of course, it will be understood that in narrower roadways a single set of trackways can be provided and vehicles can pass each other without undue trouble on said roadways. As the tread plates 2 are preferably constructed of metal, it will be readily seen that they will be practically indestructible from use and may be treated in any manner to prevent undue rusting thereof and should one of the plates become broken or otherwise become useless, it can be readily replaced without disturbing the base of the roadway in order to get the same loose.

The invention claimed is:

1. In a roadway construction, the combination with a hardened base formed of plastic material, and benches carried by said base portion, of tread plates, bolts adapted to extend through said tread plates to hold the same in position on said base portion and benches, and means carried by the benches for engagement with said bolts to normally hold said bolts against vertical movement.

2. In a roadway construction, the combination with a supporting means, and tread plates mounted thereon, of securing bolts for anchoring said tread plates, and yielding means carried by said benches for engagement with said bolts for normally holding the bolts against longitudinal movement.

In witness whereof, I have hereunto affixed my signature.

ROY S. HYSOM.